United States Patent
Igarashi et al.

(10) Patent No.: US 10,266,728 B2
(45) Date of Patent: Apr. 23, 2019

(54) PROTECTION SHEET FOR VEHICLE WINDOW PLATE

(71) Applicant: NITTO DENKO CORPORATION, Osaka (JP)

(72) Inventors: Takeshi Igarashi, Osaka (JP); Toshitaka Suzuki, Osaka (JP); Nao Wakayama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 417 days.

(21) Appl. No.: 14/902,931

(22) PCT Filed: Jun. 6, 2014

(86) PCT No.: PCT/JP2014/065150
§ 371 (c)(1),
(2) Date: Jan. 5, 2016

(87) PCT Pub. No.: WO2015/005040
PCT Pub. Date: Jan. 15, 2015

(65) Prior Publication Data
US 2016/0137883 A1    May 19, 2016

(30) Foreign Application Priority Data
Jul. 8, 2013 (JP) .................................. 2013-143047

(51) Int. Cl.
*B32B 7/12* (2006.01)
*C09J 7/20* (2018.01)
(Continued)

(52) U.S. Cl.
CPC  *C09J 7/20* (2018.01); *B32B 7/00* (2013.01); *B32B 7/02* (2013.01); *B32B 7/04* (2013.01);
(Continued)

(58) Field of Classification Search
CPC . C08L 2201/56; C08L 2312/00; C09J 133/04; C09J 2201/122; C09J 2201/606;
(Continued)

(56) References Cited

U.S. PATENT DOCUMENTS 8,039,103 B2 * 10/2011 Tosaki ....................... C09J 7/38
428/355 AC
2003/0012949 A1 * 1/2003 Yamamoto ......... C08G 18/4063
428/355 AC
(Continued)

FOREIGN PATENT DOCUMENTS

EP     1 918 342    5/2008
JP     2000-96009   4/2000
(Continued)

OTHER PUBLICATIONS

Official Action, along with English-language translation thereof, in JP Appl. No. 2013-143047 dated Oct. 6, 2016.
(Continued)

*Primary Examiner* — Lawrence D Ferguson
(74) *Attorney, Agent, or Firm* — Greenblum & Bernstein, P.L.C.

(57) ABSTRACT

A protection sheet is provided for application to a vehicle window plate to protect the window plate. Protection sheet includes a substrate and a PSA layer provided on one surface of substrate. Protection sheet has a 30-minute peel strength (S1) of less than 0.10 N/20 mm and a 48-hour peel strength (S2) of 0.05 N/20 mm or greater when applied to a glass plate by a wet application method where water is provided to the surface of the glass plate and protection sheet is press-bonded to the glass plate while pushing the water present between the glass plate surface and PSA layer to the outside of the bonding area.

3 Claims, 1 Drawing Sheet

(51) Int. Cl.

| | |
|---|---|
| *B32B 27/08* | (2006.01) |
| *B32B 27/30* | (2006.01) |
| *C09J 133/04* | (2006.01) |
| *B32B 7/00* | (2019.01) |
| *B32B 7/02* | (2019.01) |
| *B32B 7/04* | (2019.01) |
| *B32B 27/00* | (2006.01) |
| *B32B 27/06* | (2006.01) |
| *B32B 27/18* | (2006.01) |
| *C09J 7/38* | (2018.01) |

(52) U.S. Cl.
CPC ............... *B32B 7/12* (2013.01); *B32B 27/00* (2013.01); *B32B 27/06* (2013.01); *B32B 27/08* (2013.01); *B32B 27/18* (2013.01); *B32B 27/30* (2013.01); *B32B 27/308* (2013.01); *C09J 7/385* (2018.01); *C09J 133/04* (2013.01); *B32B 2307/40* (2013.01); *B32B 2307/412* (2013.01); *B32B 2307/50* (2013.01); *B32B 2307/552* (2013.01); *B32B 2307/554* (2013.01); *B32B 2307/558* (2013.01); *B32B 2307/584* (2013.01); *B32B 2307/728* (2013.01); *B32B 2307/732* (2013.01); *B32B 2571/00* (2013.01); *B32B 2605/00* (2013.01); *B32B 2605/006* (2013.01); *B32B 2605/08* (2013.01); *C08L 2201/56* (2013.01); *C08L 2312/00* (2013.01); *C09J 2201/122* (2013.01); *C09J 2201/606* (2013.01); *C09J 2433/00* (2013.01)

(58) Field of Classification Search
CPC ........ C09J 2433/00; C09J 7/02; C09J 7/0217; B32B 2307/40; B32B 2307/412; B32B 2307/50; B32B 2307/552; B32B 2307/554; B32B 2307/558; B32B 2307/584; B32B 2307/728; B32B 2307/732; B32B 2571/00; B32B 2605/00; B32B 2605/006; B32B 2605/08; B32B 27/00; B32B 27/06; B32B 27/08; B32B 27/18; B32B 27/30; B32B 27/308; B32B 7/00; B32B 7/02; B32B 7/04; B32B 7/12
See application file for complete search history.

(56) References Cited

U.S. PATENT DOCUMENTS

| | | |
|---|---|---|
| 2008/0220249 A1 | 9/2008 | Saitou et al. |
| 2009/0123739 A1 | 5/2009 | Saitou et al. |

FOREIGN PATENT DOCUMENTS

| | | |
|---|---|---|
| JP | 2001-525278 | 12/2001 |
| JP | 2007-84795 | 4/2007 |
| JP | 2007-246589 | 9/2007 |
| JP | 2008-69204 | 3/2008 |
| JP | 2010-121044 | 6/2010 |
| WO | 99/28400 | 6/1999 |

OTHER PUBLICATIONS

Extended European Search Report in EP Appl. No. 14822958.6 dated Nov. 3, 2016.
Official Action, along with English-language translation thereof, in JP Application No. 2013-143047 dated Dec. 22, 2016.
International Search Report, with English-language translation thereof, for PCT/2014/065150 dated Sep. 2, 2014.
English Translation of Written Opinion of the International Searching Authority for PCT/2014/065150 dated Sep. 2, 2014.
International Preliminary Report on Patentability for PCT/2014/065150 dated Jan. 12, 2016.

\* cited by examiner

[Fig. 1]
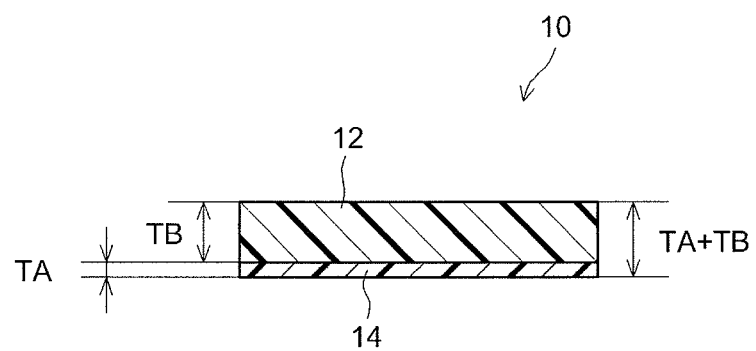
[Fig. 2]
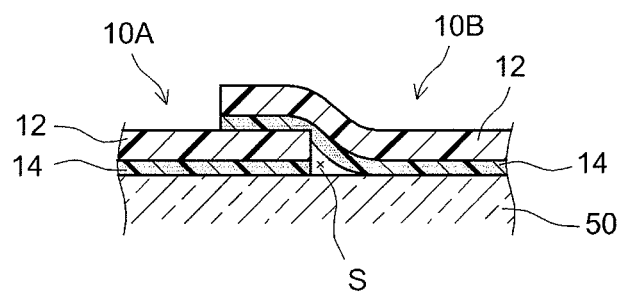

PROTECTION SHEET FOR VEHICLE WINDOW PLATE

TECHNICAL FIELD

The present invention relates to a vehicle window plate protection sheet to be applied to a window plate of an automobile or other vehicle to protect the window plate.

The present invention claims priority based on Japanese Patent Application No. 2013-143047 filed on Jul. 8, 2013; and the entire contents thereof are incorporated herein by reference.

BACKGROUND ART

In the course of storage and distribution of automobiles, etc., to protect their exterior paint films (coatings) from damage, dirt collection, etc., a technique of applying coating protection sheets to paint films is known. A coating protection sheet used for such a purpose is generally constructed to comprise a non-porous plastic film (substrate) and a PSA layer provided to one face thereof and to be adhered via the PSA layer to a coated surface of an automobile to achieve the protection purpose.

Similarly to the paint films, window plates (typically glass windows) of automobiles are exposed to the outside of the automobiles and may suffer damage, etc., in the course of storage and distribution. For instance, while an automobile is being transported, its window plates may get partially scratched or cracked when hit by a pebble kicked up off the road (flying pebble), etc. Scratches and cracks in an automobile window plate are likely to result in significant additional work and costs as they may require a complete replacement of the window plate. Thus, lately, in the course of storage and distribution of automobiles, etc., there is increasing demand for protective materials to protect window plates of the automobiles. Technical literatures related to PSA sheets that are applied to the outer surfaces of automobile window plates for their protection include Patent Documents 1 to 3.

CITATION LIST

Patent Literature

[Patent Document 1] Japanese Patent Application Publication No. 2007-84795
[Patent Document 2] Japanese Patent Application Publication No. 2007-246589
[Patent Document 3] Japanese Patent Application Publication No. 2010-121044

SUMMARY OF INVENTION

Technical Problem

Despite of such demand, PSA sheets to protect window plates have not been widely used yet in the course of storage and distribution of automobiles, etc. One of the causes for this may be that it is generally difficult to properly apply two-dimensional PSA sheets to the surfaces of front and rear windshields of automobiles because of their complex three-dimensional shapes or that the work for proper application requires time and effort. Improper application of a PSA sheet to a window plate may cause problems such as the PSA sheet getting fanned away by wind from the automobile after its application to result in failure of essential purpose of protection, entering of rain and the like from wrinkles formed during the application and leaving marks on the window plate to decrease the product value, and so on.

With respect to other vehicles besides automobiles, for instance, in railway vehicles such as bullet trains as well as in an-crafts and the like, it is also desired to prevent damage to window plates in the course of storage and distribution, etc.

The present invention has been made under such circumstances. A primary objective thereof is to provide a vehicle window plate protection sheet suited for protecting window plates of automobiles and other vehicles.

Solution to Problem

This description provides a vehicle window plate protection sheet which is applied to a window plate of a vehicle to protect the window plate. The protection sheet comprises a substrate and a PSA layer provided to one face of the substrate. Herein, the protection sheet may satisfy the following conditions:
(A) having a 30-minute peel strength (S1) of less than 0.10 N/20 mm when the protection sheet is applied to a glass plate by a wet application method where water is provided to the surface of the glass plate and the protection sheet is press-bonded to the glass plate while pushing the water present between the glass plate surface and the PSA layer to the outside of the bonding area
(B) having a 48-hour peel strength (S2) of 0.05 N/20 mm or greater when applied to the glass plate by the wet application method.

The protection sheet with a low 30-minute peel strength (S1) is preferable because it provides great application workability to a window plate. For instance, it can achieve suitable application to a window plate in shorter work time. More specifically, for instance, when the protection sheet is applied to the window plate (adherend) by the wet application method, the PSA layer of the protection sheet can readily slide in an in-plane direction of the window plate. In other words, there is little resistance when the position of the PSA layer is shifted in an in-plane direction of the window plate. Thus, even if a wrinkle is about to form in an area of the protection sheet, the protection sheet can be properly applied to conform to the surface structure of the window plate while stretching out the wrinkle. In addition, even if some bubbles are formed between the PSA layer and the window plate during the application of the protection sheet, the bubbles can be easily moved in an in-plane direction of the protection sheet and pushed out around edges of the protection sheet. When the window plate surface is curved with a three-dimensional shape or when the protection sheet size is relatively large, the low 30-minute peel strength (S1) is particularly meaningful because wrinkles and bubbles tend to be easily formed during application of the protection sheet.

The protection sheet having a high 48-hour peel strength (S2) is less likely to lift from the window plate surface after the application of the PSA sheet is complete. In other words, it exhibits excellent anti-lifting properties. The protection sheet with excellent anti-lifting properties is less likely to be blown away by wind from the window plate, for instance, when the window plate with the protection sheet applied thereon is stored outdoor or even when a vehicle having the window plate with the protection sheet applied thereon is transported at a high speed while it is exposed to the outside air.

As the PSA layer of the protection sheet disclosed herein, a PSA layer (acrylic PSA layer) comprising an acrylic polymer as the base polymer can be preferably used. In general, acrylic polymer provides great weatherability by nature. Thus, the protection sheet having an acrylic PSA layer may provide great protection for a long period with little degradation of the PSA even when a vehicle (e.g. an automobile) having a window plate with the protection sheet applied thereon is stored outside, etc.

In a preferable embodiment of the protection sheet disclosed herein, the PSA layer of the protection sheet may be formed with a solvent-based PSA composition. The solvent-based PSA composition is in a uniform phase; and therefore, it is likely to form a highly transparent PSA layer. The highly transparent PSA layer is advantageous for a protection sheet applied to a window plate of a vehicle.

The PSA layer of the protection sheet disclosed herein preferably comprises a base polymer and an application aider. The inclusion of the application aider in the PSA layer makes it easier to balance the ease of application and anti-lifting properties of the protection sheet. This preferably allows more latitude in selecting the configuration (e.g. the thickness of the PSA layer) of the protection sheet so as to achieve the balance.

It is usually suitable that the application aider content relative to 100 parts by weight of the base polymer is about 10 parts by weight or less (i.e. greater than 0 up to 10 parts by weight). The lower limit of the application aider content is not particularly limited. From the standpoint of obtaining greater effects of the application aider content, for instance, it can be 0.01 part by weight or greater to 100 parts by weight of the base polymer.

As the application aider, one, two or more species can be preferably used, selected among anionic surfactants, non-ionic surfactants and hydrophilic polymers. For example, an anionic surfactant not forming a salt with a cation is preferable.

The protection sheet disclosed herein preferably has a PSA layer thickness TA of 1 µm or larger. The protection sheet disclosed herein preferably has a substrate thickness TB of 20 µm or larger, but 300 µm or smaller. The thickness TA of the PSA layer is preferably 3% or more of the combined thickness (TA+TB, typically corresponding to the overall thickness of the protection sheet) of the PSA layer thickness TA and the substrate thickness TB.

Designed with the PSA layer thickness TA accounting for at least a certain percentage of the overall thickness (TA+TB) of the protection sheet, the protection sheet in such a configuration may exhibit great conformability to a step (a difference in level) that may be present on the surface to which the protection sheet is applied (the step can be of a ridge formed with a piece of the protection sheet applied beforehand to the window plate). In other words, the PSA layer can deform to absorb (fill) at least part of the step; and therefore, at the step, no excessive gap is likely to form between the surface and the protection sheet. Accordingly, it can prevent water from entering the bonding area of the protection sheet via the gap, bringing about a high level of protection. According to a configuration where the PSA layer thickness TA is 1 µm or larger and the substrate thickness TB is 300 µm or smaller, because of the adhesive strength of the PSA layer, the entire protection sheet can be easily maintained in a form deformed along the step, whereby the effect to inhibit the entering of water can be produced to a greater extent.

BRIEF DESCRIPTION OF DRAWINGS

FIG. 1 shows a schematic cross-sectional view of a configurational example of the vehicle window plate protection sheet.

FIG. 2 shows a schematic cross-sectional view of an example of pieces of the protection sheet applied with a partially overlapping area.

DESCRIPTION OF EMBODIMENTS

Preferred embodiments of the present invention are described below although the present invention is not limited to these embodiments. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate size or reduction scale of a PSA sheet that is actually used.

The vehicle window plate protection sheet disclosed herein can be applied to and used on window plates of various vehicles. The vehicle referred to herein is not limited to a species that primarily carries a person and it can be for primarily carrying a non-human creature or an inanimate object. The concept of vehicle may encompass transportation equipment and machines such as automobiles (including a passenger vehicle, truck, bus, motor tricycle, tractor, snow mobile, bulldozer, amphibious vehicle, etc.), railroad vehicles (including trains such as bullet trains, diesel vehicle, maglev train, cable car, monorail, trolley bus, etc.), aircraft (including an airplane, helicopter, air cushion craft, etc.), vessels (including a large ship, small ship, water scooter, etc.) and the like.

The window plate (window panel) is a member that constitutes a window (window member) of such a vehicle. It usually transmits light and is typically a transparent member. The material of the window plate is not particularly limited. For instance, the window plate may primarily comprise an inorganic material such as glass or may primarily comprise an organic material such as plastic. Herein, the window plate primarily comprising an inorganic material refers to a window plate of which more than 50% of its weight is formed of an inorganic material. Similarly, the window plate primarily comprising an organic material refers to a window plate of which more than 50% of its weight is formed of an organic material. Examples of a preferable object for application of the art disclosed herein include a window plate made of glass, that is, a glass window. The concept of glass window herein may encompass a glass window formed of a single glass plate, a glass window formed of a composite material (laminated glass) having an intermediate layer formed of an organic material between two glass plates, and the like. Examples of other preferable objects for application include a window plate primarily comprising an organic material (typically a plastic material) such as polycarbonate, acrylic resin, cyclic polyolefinic resin, phenol resin, etc.

The vehicle window plate protection sheet disclosed herein is not limited to a species that is applied to a window plate of a vehicle after the vehicle is completely assembled and can be applied to any member that eventually serves as a window plate of a vehicle. In other words, the vehicle window plate protection sheet disclosed herein can be applied to a window plate installed in a vehicle either finished or being produced or to a window plate before installed in a vehicle.

In this description, the edges of a window plate refer to the edges (limits) of in-plane directions in the area where its surface is exposed to the outside when the window plate is installed in a vehicle with no protection sheet applied thereon. Thus, for instance, in a glass window equipped with a window molding around its perimeter for installation in an automobile, the edges of the window plate are the line segments dividing the area integrated in the window molding and the area exposed outside the window molding in the surface of the window plate.

In this description, proper application of the protection sheet to a window plate means achieving a state of adhesion suited to protect the window plate. For example, reducing the number and extent (length, etc.) of wrinkles possibly formed during application of the protection sheet is effective in achieving the suitable state of adhesion.

As the substrate of the vehicle window plate protection sheet disclosed herein, a plastic film can be preferably used. The concept of plastic film herein typically refers to a thin, non-porous plastic layer and is distinct from the woven fabric and non-woven fabric. The plastic film may have a single-layer structure or a multi-layer structure including two, three or more layers. From the standpoint of the transparency, a plastic film having a single-layer structure can be preferably used.

The resin material constituting the plastic film as the substrate (or the film substrate, hereinafter) is not particularly limited. Examples include polyolefin resins; polyester resins such as polyethylene terephthalate (PET), etc.; polyamide resins; polycarbonate resins; polyurethane resins; acrylic resins; and the like. These can be used singly as one species or in a combination of two or more species. When two or more species of resins are used in combination, these resins may be blended for the use or used separately (e.g. as the materials constituting different layers in a plastic film having a multi-layer structure).

From the standpoint of the weatherability and transparency, etc., as the substrate, a plastic film substrate in which the primary component of the resin material is a polyolefin resin can be preferably used. Herein, the primary component of the resin material being a polyolefin resin means that the polyolefin resin accounts for more than 50% by weight of the resin material. The polyolefin resin content in the resin material is preferably 70% by weight or greater, more preferably 90% by weight or greater, or yet more preferably 95% by weight or greater. In a preferable embodiment, the resin material essentially consists of a polyolefin resin.

Preferable examples of the polyolefin resin include a polyethylene resin (PE) and a polypropylene resin (PP). A preferable plastic film substrate comprises one or both of PE and PP as the resin material. In a preferable embodiment, 75% by weight or more of the resin material in the plastic film substrate is PP. Essentially 100% by weight of the resin material in the plastic film substrate may be PP. When the resin material comprises another resin in addition to PP, the other resin may be a polyolefin other than PP, for instance, PE.

The PP may be various types of polymer formed from propylene (propylene-based polymer). The concept of propylene-based polymer includes the following examples.

Propylene homopolymers (homo-polypropylenes). For example, isotactic polypropylene, syndiotactic polypropylene and atactic polypropylene.

Random copolymers (random polypropylenes) of propylene with other $\alpha$-olefins. Typically, a random copolymer of propylene with one, two or more species selected among ethylene and $\alpha$-olefins with 4 to 10 carbons. Preferably, a random copolymer formed from propylene being the primary monomer (i.e. a component accounting for more than 50% by weight of all monomers combined; the same applies hereinafter). For example, a random copolymer of 96 to 99.9% (by mole) propylene and 0.1 to 4% (by mole) other $\alpha$-olefin(s) (preferably ethylene and/or butane).

Copolymers (block polypropylenes) of propylene block-copolymerized with other $\alpha$-olefin(s). Typically, a copolymer of propylene block-copolymerized with one, two or more species selected from ethylene and $\alpha$-olefins with 4 to 10 carbons. A block polypropylene formed from propylene being the primary monomer is preferable. Typically, as a side product, a rubber component formed from propylene and at least one species among the other $\alpha$-olefins is further included. For instance, a block polypropylene comprising a polymer formed by block copolymerization of 90 to 99.9% (by mole) propylene and 0.1 to 10% (by mole) other $\alpha$-olefin(s) (preferably ethylene and/or butane) and further comprising, as a side product, a rubber component formed from propylene and at least one species among the other $\alpha$-olefins.

A thermoplastic olefin resin (TPO) or thermoplastic elastomer (TPE) of a reactor blend type obtainable by copolymerizing a large amount of a rubber component with a propylene-based polymer as described above. Alternatively, a TPO or TPE of a dry blend type obtainable by mechanically dispersing the rubber component.

A copolymer of propylene with a monomer (a functional group-containing monomer) having another functional group in addition to the polymerizable functional group and a copolymer of a propylene-based polymer with such a functional group-containing monomer.

The resin material constituting the plastic film substrate may comprise one, two or more species of such PP. When two or more species of PP are included, these PP may be blended for the use or used separately. The usage ratio (blend ratio) of these PP is not particularly limited.

The PE may be various types of polymer formed from ethylene (ethylene-based polymer). The ethylene-based polymer may be an ethylene homopolymer or a copolymer of ethylene as the primary monomer and other $\alpha$-olefin(s). Preferable examples of the other $\alpha$-olefin include $\alpha$-olefins with 3 to 10 carbons such as propylene, 1-butene (possibly a branched 1-butene), 1-hexene, 4-methyl-1-pentene, 1-octene, etc. It can also be a copolymer of ethylene and a monomer (functional group-containing monomer) having another functional group in addition to the polymerizable functional group, a copolymer of such a functional group-containing monomer and an ethylene-based polymer, etc. Examples of the copolymer of ethylene and a functional group-containing monomer include an ethylene-vinyl acetate copolymer (EVA), ethylene-acrylic acid copolymer (EAA), ethylene-methacrylic acid copolymer (EMAA), ethylene-methyl acrylate copolymer (EMA), ethylene-ethyl acrylate copolymer (EEA), ethylene-methyl methacrylate copolymer (EMMA), copolymer of ethylene and (meth) acrylic acid (i.e. acrylic acid and/or methacrylic acid) cross-linked with metal ions, and so on. Examples of the PE also include high density polyethylene (HDPE), medium density polyethylene (MDPE), low density polyethylene (LDPE) and linear low density polyethylene (LLDPE).

The resin material constituting the plastic film substrate may comprise one, two or more species among these PE. When two or more species of PE are included, these PE may be blended for the use or used separately. The usage ratio (blend ratio) of these PE is not particularly limited.

In the film substrate, as necessary, suitable additives can be added among known species that can be used in plastic film used as the substrate in a general PSA sheet (typically a film substrate of a protection sheet), such as light stabilizer including radical scavenger and ultraviolet absorber, antioxidant, antistatic agent, colorant (dye, pigment, etc.), filler, slip agent and anti-blocking agent. Examples of light stabilizer include those containing benzotriazoles, hindered amines, benzoates, etc., as active ingredients. Examples of antioxidant include those containing alkylphenols, alkylene bisphenols, thiopropylene acid esters, organic phosphites, amines, hydroquinones, hydroxylamines, etc., as active ingredients. These additives may be used singly as one species or in a combination of two or more species. The amount of additive(s) added can be about the same level as an amount usually added in plastic film used as a substrate in a general PSA sheet.

Such a film substrate may be manufactured by suitably employing a conventionally known general film-forming method (e.g., extrusion, inflation, etc.). The surface of the film substrate on the side to which a PSA layer is provided (the PSA layer side surface) may be subjected to a treatment to increase adhesion to the PSA layer, such as corona discharge treatment, acid treatment, ultraviolet irradiation treatment, plasma treatment, primer coating, etc. Of the film substrate, the face (back face) opposite from the face to which the PSA layer is provided may be subjected, as necessary, to a surface treatment such as antistatic treatment, release treatment and water repellent treatment.

On the film substrate, there can be shown some information about the purpose (vehicle type, type of glass window, etc.) of the PSA sheet using the film substrate as well as marks for positioning the PSA sheet, etc. The marks may be useful when applying two or more pieces of the protection sheet with partially overlap, for positioning the PSA sheet pieces in relation to one another, positioning the PSA sheet against the window plate, and so on. These information and marks may be provided by a known means such as printing, etc.

The type of PSA constituting the PSA layer of the PSA sheet disclosed herein is not particularly limited. For example, the PSA layer may be formed to include one, two or more species of PSA selected from various known PSA species such as acrylic PSA, rubber-based PSA (natural rubber-based, synthetic rubber-based, a mixture of these, etc.), silicone-based PSA, polyester-based PSA, urethane-based PSA, polyether-based PSA, polyamide-based PSA, and fluorine-based PSA. Herein, the acrylic PSA refers to a PSA comprising an acrylic polymer as a base polymer (a primary component among polymers, i.e. a component accounting for more than 50% by weight). The same applies to the rubber-based and other PSA. In a PSA layer preferable from the standpoint of the weatherability, transparency, etc., the acrylic PSA content is 50% by weight or greater, more preferably 70% by weight or greater, or yet more preferably 90% by weight or greater. The acrylic PSA content can be greater than 98% by weight. The PSA layer may essentially consist of an acrylic PSA.

Such an acrylic PSA (PSA layer) can be formed with a PSA composition comprising an acrylic polymer as the base polymer. The acrylic polymer is typically a copolymer of a monomer mixture comprising an alkyl (meth)acrylate as the primary monomer (a component accounting for more than 50% by weight of all monomers) and further comprising a secondary monomer copolymerizable with the primary monomer. The monomer mixture may optionally comprise other copolymerizable component(s) in addition to these primary and secondary monomers.

In this description, the term "(meth)acrylate" refers collectively to acrylate and methacrylate. Likewise, the term "(meth)acryloyl" refers collectively to acryloyl and methacryloyl, and the term "(meth)acryl" refers collectively to acryl and methacryl.

As the alkyl (meth)acrylate, for example, can be used compounds represented by the following formula (1):

$$CH_2=C(R^1)COOR^2 \qquad (1)$$

Herein, $R^1$ in the formula (1) is a hydrogen atom or a methyl group. $R^2$ is an acyclic alkyl group having 1 to 20 carbon atoms (hereinafter, such a range of number of carbon atoms may be represented by "$C_{1-20}$"). From the standpoint of the storage elastic modulus of the PSA, etc., an alkyl (meth)acrylate with $R^2$ being an acyclic $C_{1-14}$ alkyl group is preferable, an alkyl (meth)acrylate with $R^2$ being an acyclic $C_{1-10}$ (e.g. $C_{2-8}$) alkyl group is more preferable, and an alkyl (meth)acrylate with $R^2$ being a butyl group or 2-ethylhexyl group is particularly preferable.

Examples of an alkyl (meth)acrylate having the $C_{1-20}$ acyclic alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. These can be used singly as one species or in a combination of two or more species. Particularly preferable alkyl (meth)acrylates include n-butyl acrylate (BA) and 2-ethylhexyl acrylate (2EHA).

The vehicle window plate protection sheet disclosed herein is typically used in an embodiment such that in the course of storage, distribution and so on of a vehicle, after serving to protect a window plate of the vehicle, it is removed from the window plate. Thus, it is preferable that the protection sheet exhibits good removability on window plates. The good removability can be thought as, for example, a property that hinders the leaving of residue of PSA, etc., on the window plate surface when the protection sheet is removed from the window plate.

The secondary monomer copolymerizable with the alkyl (meth)acrylate being the primary monomer may be useful for introducing crosslinking points in the acrylic polymer or increasing the cohesive strength of the acrylic polymer. Increased cohesion of the acrylic polymer may advantageously contribute to increase the removability of the PSA. As the secondary monomer, for instance, the following functional group-containing monomers can be used singly or in a combination of two or more species:

Carboxy group-containing monomers: for example, ethylenic unsaturated mono-carboxylic acids such as acrylic acid, methacrylic acid, crotonic acid, etc.; ethylenic unsaturated dicarboxylic acids such as maleic acid, itaconic acid, citraconic acid, etc., as well as anhydrides thereof (maleic acid anhydride, itaconic acid anhydride, etc.).

Hydroxy group-containing monomers: for example, hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, etc.; unsaturated alcohols such as vinyl alcohol, allyl alcohol, etc.

Amide group-containing monomers: for example, (meth)acrylamide, N,N-dimethyl(meth)acrylamide, N-butyl(meth)acrylamide, N-methylol(meth)acrylamide, N-methylolpropane(meth)acrylamide, N-methoxymethyl(meth)acrylamide, N-butoxymethyl(meth)acrylamide.

Amino group-containing monomers: for example, aminoethyl (meth)acrylate, N,N-dimethylaminoethyl (meth)acrylate, t-butylaminoethyl (meth)acrylate.

Epoxy group-containing monomers: for example, glycidyl (meth)acrylate, methylglycidyl (meth)acrylate, allyl glycidyl ether.

Cyano group-containing monomers: for example, acrylonitrile, methacrylonitrile.

Keto group-containing monomers: for example, diacetone (meth)acrylamide, diacetone (meth)acrylate, vinyl methyl ketone, vinyl ethyl ketone, allyl acetoacetate, vinyl acetoacetate.

Monomers having nitrogen atom-containing rings: for example, N-vinyl-2-pyrrolidone, N-methylvinylpyrrolidone, N-vinylpyridine, N-vinylpiperidone, N-vinylpyrimkline, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine.

Alkoxysilyl group-containing monomers: for example, (3-(meth)acryloxypropyl)trimethoxysilane, (3-(meth)acryloxypropyl)triethoxysilane, (3-(meth)acryloxypropyl)methyldimethoxysilane, (3-(meth)acryloxypropyl)methyldiethoxysilane.

The amount of the secondary monomer should just be suitably selected so as to obtain desirable cohesive strength and is not particularly limited. Usually, from the standpoint of combining cohesive strength and adhesive strength in a well-balanced manner, the amount of the secondary monomer is, to 100 parts by weight of the alkyl (meth)acrylate, suitably 20% by weight or less in total, preferably 15% by weight or less, or more preferably 10% by weight or less.

For the purpose of increasing the cohesive strength of the acrylic polymer, etc., other co-monomer(s) besides the aforementioned secondary monomers can be used. Examples of such co-monomers include vinyl ester-based monomers such as vinyl acetate, vinyl propionate, etc.; aromatic vinyl compounds such as styrene, substituted styrenes (α-methylstyrene, etc.), vinyl toluene, etc.; non-aromatic ring-containing (meth)acrylates such as cycloalkyl (meth)acrylates (cyclohexyl (meth)acrylate, cyclopentyl di(meth)acrylate, etc.) and isobornyl (meth)acrylate; aromatic ring-containing (meth)acrylates such as aryl (meth)acrylate (e.g. phenyl (meth)acrylate), aryloxyalkyl (meth)acrylate (e.g. phenoxyethyl (meth)acrylate), arylalkyl (meth)acrylate (e.g. benzyl (meth)acrylate), etc.; olefinic monomers such as ethylene, propylene, isoprene, butadiene, isobutylene, etc.; chlorine-containing monomers such as vinyl chloride, vinylidene chloride, etc.; isocyanate group-containing monomers such as 2-(meth)acryloxyethyl isocyanate, etc.; alkoxy group-containing monomers such as methoxyethyl (meth)acrylate, ethoxyethyl (meth)acrylate, etc.; vinyl ether-based monomers such as methyl vinyl ether, ethyl vinyl ether, etc.; and the like. The amount of such other co-monomer(s) can be suitably selected according to the purpose and intended use, and thus is not particularly limited. For instance, it is preferably about 10 parts by weight or less to 100 parts by weight of the alkyl (meth)acrylate. Alternatively, essentially no such comonomer(s) may be used in the acrylic polymer.

In a preferable example of the acrylic polymer in the art disclosed herein, the monomer mixture has a composition comprising an alkyl (meth)acrylate (monomer (a)) in which $R^2$ in the formula (1) is a $C_{6-16}$ acyclic alkyl group and an alkyl (meth)acrylate (monomer (b)) in which $R^2$ in the formula (1) is a $C_{1-3}$ acyclic alkyl group. The monomer (a) content in the monomer mixture is preferably 30% by weight or greater, typically 30 to 70% by weight, for instance, 40 to 60% by weight. The monomer (b) content in the monomer mixture is preferably 30% by weight or greater, typically 30 to 70% by weight, for instance, 40 to 60% by weight. With 30% or higher monomer (a) content by weight, the PSA layer comprising an acrylic polymer having such a composition as the base polymer is highly flexible and brings about tight adhesion to the adherend surface. With 30% or higher monomer (b) content by weight, it shows adequate hydrophilicity. This can increase the water wettability of the PSA layer surface to a suitable level and contribute to increase the ease of application by the wet application method.

When the monomer mixture comprises a monomer (a) and a monomer (b), the ratio of monomer (a) content to monomer (b) content can be, but not particularly limited to, for instance, 0.6 to 1.3 by weight, or is preferably 0.8 to 1.1.

The monomer mixture preferably comprises 2 to 20 parts by weight of a hydroxy group-containing monomer to 100 parts by weight of the alkyl (meth)acrylate although there are no particular limitations. From the standpoint of increasing the hydrophilicity and cohesion of the PSA layer within suitable ranges, the amount of the hydroxy group-containing monomer relative to 100 parts by weight of the alkyl (meth)acrylate can be, for instance, 3 to 15 parts by weight, or is preferably 3 to 10 parts by weight. The PSA layer is preferably formed with an acrylic PSA composition comprising an acrylic polymer that has such a composition and a crosslinking agent (e.g. isocyanate-based crosslinking agent) that reacts with the hydroxy group to form crosslinks.

Although there are no particular limitations, when the monomer mixture comprises a carboxy group-containing monomer, its amount is suitably at most 10 parts by weight relative to 100 parts by weight of the alkyl (meth)acrylate. From the standpoint of avoiding excessively high hydrophilicity of the PSA layer or of preventing an excessive increase in adhesive strength to adherend with time, etc., the amount of the carboxy group-containing monomer relative to 100 parts by weight of the alkyl (meth)acrylate is preferably 5 parts by weight or less, more preferably 2 parts by weight or less, or yet more preferably 1 part by weight or less. The art disclosed herein can be preferably implemented in an embodiment where the monomer mixture is free of a carboxy group-containing monomer.

The method for obtaining the acrylic polymer is not particularly limited. Various polymerization methods known as synthetic means for acrylic polymers can be suitably employed to obtain the polymer, with the methods including a solution polymerization method, emulsion polymerization method, bulk polymerization method, suspension polymerization method, etc. Among these, for instance, the solution polymerization method can be preferably used. As the polymerization solvent, an organic solvent commonly known or used in solution polymerization of an acrylic monomer can be used, such as ethyl acetate, toluene, hexane, a mixture of these solvents, etc.

The acrylic polymer can be a random copolymer, block copolymer, graft copolymer, etc. From the standpoint of the productivity, etc., a random copolymer is usually preferable.

The acrylic PSA composition can further comprise a crosslinking agent in addition to the acrylic polymer as the base polymer. The type of crosslinking agent is not particularly limited, and a suitable one can be selected and used among various crosslinking agents usually used in the PSA field in accordance with, for example, the type of crosslinking functional group of the secondary monomer, etc. Specific examples include isocyanate-based crosslinking agents, silane-based crosslinking agents, epoxy-based crosslinking agents, oxazoline-based crosslinking agents, aziridine-based crosslinking agents, metal chelate-based crosslinking agents, etc. For the likelihood of forming a PSA layer well-balanced between adhesion and cohesion, an isocyanate-based crosslinking agent can be preferably used. The amount of crosslinking agent in the PSA composition is not particularly limited and can be selected so as to obtain intended cohesion or gel fraction. It is usually suitably 1 to 10 parts by weight (preferably 1.5 to 6 parts by weight, more preferably 2 to 5 parts by weight, e.g. 2.5 to 4 parts by weight) relative to 100 parts by weight of the acrylic polymer.

The PSA composition can comprise, as optional components, various additives generally used in the PSA field, such as antistatic agent, anti-blocking agent, leveling agent, plasticizer, filler, colorant (pigment, dye, etc.), stabilizing agent, preservative, anti-aging agent, crosslinking accelerator, pH-adjusting agent (typically an acid or base), etc. The amounts of such additives used can be generally about the same levels as the amounts used in general PSA sheets.

It is preferable to not add a tackifier to the PSA composition in view of the transparency and weatherability of the vehicle window plate protection sheet, non-contaminating nature (removability) on window plate surfaces, and so on.

The art disclosed herein can be preferably implemented in an embodiment where the PSA layer comprises an application aider in addition to the base polymer. For instance, a preferable PSA layer comprises an acrylic polymer as the base polymer and further comprises an application aider.

As the application aider, various types of material that can be included in a PSA layer to increase the hydrophilicity of the PSA layer can be used. When the hydrophilicity of the PSA layer is increased, during the application to a window plate by the wet application method, the water present between the window plate surface and the PSA layer can form a continuous water layer to a greater extent. By allowing the PSA layer to slide on such a highly continuous water layer in in-plane directions of the window plate, the application can be facilitated. Thus, the inclusion of such an application aider in the PSA layer makes it easier to balance the ease of application and anti-lifting properties of the protection sheet.

With increasing hydrophilicity of the PSA layer, the 30-minute peel strength (S1) tends to decrease. Thus, the inclusion of the application aider is also effective in reducing the 30-minute peel strength (S1).

As the application aider, known anionic surfactants, nonionic surfactants, cationic surfactants, various types of hydrophilic polymer and the like can be used. These application aiders can be used singly or in a combination of two or more species.

Examples of hydrophilic polymers include polyalkylene glycols such as polypropylene glycol and polyethylene glycol, polyvinyl alcohols and the like.

Examples of nonionic surfactants include polyoxyalkylene ethers such as polyoxyethylene alkyl ethers, polyoxyethylene alkyl phenyl ethers, polyoxypropylene glyceryl ether and polyoxyethylene bisphenol A ether; polyoxyethylene aliphatic acid esters, polyoxyethylene-polyoxypropylene block copolymers, and the like.

Examples of anionic surfactants include alkylbenzene sulfonates such as sodium dodecylbenzene sulfonate; alkyl sulfates such as sodium lauryl sulfate and ammonium lauryl sulfate; polyether amines such as polyoxyethylene lauryl amine and polyoxyethylene stearyl amine; polyether sulfates such as sodium polyoxyethylene alkyl ether sulfates, ammonium polyoxyethylene alkyl phenyl ether sulfates and sodium polyoxyethylene alkyl phenyl ether sulfates; polyoxyethylene alkyl ether phosphoric acid esters such as polyoxyethylene stearyl ether phosphoric acid ester and polyoxyethylene lauryl ether phosphoric acid ester; polyoxyethylene alkyl ether phosphoric acid ester salts such as sodium salts and potassium salts of the polyoxyethylene alkyl ether phosphoric acid ester; and sodium polyoxyethylene alkyl sulfosuccinates.

A preferable example of the application aider in the art disclosed herein is an anionic surfactant in a form where at least some of its anionic functional groups are not neutralized. In other words, a preferable anionic surfactant includes an anionic functional group not in a form of a salt with a cation. For instance, an anionic surfactant having at least one among a —POH group, —COH group and —SOH group can be preferably used. In particular, a surfactant having a —POH group is preferable. Such a surfactant typically includes a phosphoric acid ester structure and can be, for instance, a phosphoric acid monoester (ROP(=O)(OH)$_2$ wherein R is a monovalent organic group), a phosphoric acid diester ((RO)$_2$P(=O)OH wherein Rs are the same or different species of monovalent organic group), a mixture including both a phosphoric acid monoester and a phosphoric acid diester, etc.

Preferable examples of the —POH group-containing surfactant include a polyoxyethylene alkyl ether phosphoric acid ester. The number of carbon atoms of the alkyl group in the polyoxyethylene alkyl ether phosphoric acid ester is, for instance, 6 to 20, preferably 8 to 20, more preferably 10 to 20, yet more preferably 12 to 20, or particularly preferably 14 to 20.

Examples of commercial polyoxyethylene alkyl ether phosphoric acid esters include the "PHOSPHANOL®" series available from Toho Chemical Industry Co., Ltd. Specific examples include PHOSPHANOL® RL-210, RL-310, RS-410, ED-200, ML-220 and ML-240.

When a surfactant is used as the application aider, the HLB (hydrophile-lipophile balance) value of the surfactant is not particularly limited. Usually, a surfactant having a HLB value of about 3 to 15 (more preferably 4 to 10, e.g. 4 to 6) can be preferably used.

As the application aider in the art disclosed herein, a surfactant or a hydrophilic polymer, comprising a repeat structure of an oxyalkylene group such as oxyethylene and oxypropylene, can be preferably used. The average number of repeats of the oxyalkylene group can be, for instance, about 1 to 10. A nonionic or anionic surfactant having such a structure is preferable.

In the art disclosed herein, the molecular weight of the application aider is not particularly limited. From the standpoint of the cohesion of the PSA and the anti-lifting properties of the protection sheet, the molecular weight (when the molecular weight is distributed, the weight average molecular weight) of the application aider is usually preferably about 200 to 5000, or more preferably about 300 to 3000 (e.g. 300 to 2000).

The art disclosed herein can be preferably practiced, for instance, in an embodiment where the application aider consists of one, two or more species of anionic surfactant (e.g. polyoxyethylene alkyl ether phosphoric acid ester), in an embodiment where it consists of one, two or more species of nonionic surfactant, in an embodiment it consists of one, two or more species of hydrophilic polymer, in an embodiment where it consists of an anionic surfactant and a nonionic surfactant, and so on.

The amount of application aider can be selected so as to obtain desirable ease of application for the wet application method. It is preferably selected so as to combine ease of application and anti-lifting properties in a well-balanced manner. Although not particularly limited to the following, the amount of application aider used (when two or more species of application aider are used, their combined amount) can be, for instance, 20 parts by weight or less to 100 parts by weight of the base polymer, or it is usually preferably 15 parts by weight or less, or preferably 10 parts by weight or less. By lowering the amount of application aider used within a range where the desirable effect is obtained, the anti-lifting properties of the protection sheet can be increased. From the standpoint of obtaining greater anti-lifting properties, the amount of application aider used to 100 parts by weight of the base polymer can be 5 parts by weight or less, or even 4.5 parts by weight or less. From the standpoint of obtaining greater effects of the use of application aider, the amount of application aider used to 100 parts by weight of the base polymer can be, for instance, 0.01 part by weight or greater, or it is usually preferably 0.03 part by weight or greater or more preferably 0.05 part by weight or greater (e.g. 0.07 part by weight or greater).

The more preferable amount of application aider used may vary depending on the type of application aider as well. For instance, when a polyoxyethylene alkyl ether phosphoric acid ester is used as the application aider, from the standpoint of obtaining greater anti-lifting properties, the amount of the polyoxyethylene alkyl ether phosphoric acid ester to 100 parts by weight of the base polymer is preferably 1.0 part by weight or less, or more preferably 0.5 part by weight or less (e.g. 0.3 part by weight or less). The amount of the polyoxyethylene alkyl ether phosphoric acid ester to 100 parts by weight of the base polymer can be, for instance, 0.01 part by weight or greater, or it is usually preferably 0.03 part by weight or greater, or more preferably 0.05 part by weight or greater (e.g. 0.07 part by weight or greater).

The form of the PSA composition used for forming the PSA layer disclosed herein is not particularly limited. The PSA composition can be in various forms such as a solvent-based PSA composition containing the PSA (adhesive component(s)) in an organic solvent, a water-dispersed PSA composition containing the PSA dispersed in an aqueous solvent, an active energy ray-curable PSA composition formulated so as to cure with active energy rays such as UV rays and radioactive rays to form PSA, and a hot-melt PSA composition which is applied in the molten state by heating and forms PSA when it cools to near room temperature. An example of preferable PSA compositions among these is the solvent-based PSA composition. Because the solvent-based PSA composition is in a uniform phase, it is likely to form a highly transparent PSA layer. The highly transparent PSA layer is advantageous for the protection sheet applied to a window plate of a vehicle. The PSA layer formed from the solvent-based PSA composition is preferable also from the standpoint that it makes it easy to adjust the peel strength of the PSA sheet. The solvent-based PSA composition may comprise a base polymer (typically an acrylic polymer), an application aider as well as other component(s) (a crosslinking agent, etc.) used as necessary in an organic solvent.

The solvent-based PSA composition can be preferably prepared, for instance, by adding the application aider and other component(s) used as necessary to an organic solvent solution of the base polymer and mixing them. The organic solvent solution may be a polymerization reaction mixture comprising an acrylic polymer obtained by a solution polymerization method. In general, the solution polymerization is carried out in absence of a surfactant, the polymerization reaction mixture is typically free of a surfactant. It is preferable to add (afterwards) an application aider such as a surfactant to such a polymerization reaction mixture to prepare the PSA composition.

FIG. 1 schematically shows an example of a typical cross-sectional structure of the vehicle window plate protection sheet disclosed herein. Protection sheet 10 comprises a substrate 12 and a PSA layer provided to the first surface of the substrate 12.

The thickness TA of PSA layer 14 is not particularly limited. From the standpoint of the adhesion to a window plate surface, etc., the thickness TA of the PSA layer is usually suitably 1 µm or larger, preferably 2 µm or larger, more preferably 3 µm or larger, or yet more preferably 5 µm or larger. With increasing PSA layer thickness TA, the step-absorbing (step-filling) ability tends to increase. The upper limit of the PSA layer thickness TA is not particularly limited. It is usually suitably 50 µm or smaller, or preferably 30 µm or smaller. From the standpoint of the transparency and ease of application of the protection sheet, etc., the PSA layer thickness TA is preferably 20 µm or smaller, more preferably 15 µm or smaller, or yet more preferably 10 µm or smaller. From the standpoint of obtaining higher transparency and greater ease of application, the PSA layer thickness TA can be smaller than 10 µm or even smaller than 8 µm.

The PSA layer thickness TA can be determined by arithmetically averaging values measured at five points using a 1/10000 dial gauge. More specifically, the PSA layer thickness TA can be determined by measuring the overall thickness of the protection sheet (the combined thickness of the PSA layer and substrate, i.e. TA+TB) and the substrate thickness TB at five points each using a 1/10000 dial gauge; and subtracting the arithmetic average value of the measured values of the latter (TB) from the arithmetic average value of the measured values of the first (TA+TB).

The thickness TB of substrate 12 is not particularly limited and can be, for instance, about 20 µm to 300 µm. When the protection sheet 10 is applied in layers, from the standpoint of reducing the height of the resulting step(s) to minimize gaps possibly formed at the step(s), the substrate thickness TB is usually suitably 200 µm or smaller, preferably 150 µm or smaller, more preferably 100 µm or smaller, or yet more preferably 80 µm or smaller. On the other hand, from the standpoint of the handling properties of the protection sheet and the ability to prevent damage to window plates upon physical impacts by flying pebbles and the like, the substrate thickness TB is suitably 25 µm or larger, preferably 30 µm or larger, or more preferably 40 µm or larger.

The protection sheet disclosed herein is preferably configured so that the PSA layer thickness TA accounts for 3% or more of the overall thickness (TA+TB) of the protection sheet. In other words, the protection sheet disclosed herein preferably satisfies 0.03≤TA/(TA+TB). This is explained now with reference to the schematic diagram shown in FIG. 2.

FIG. 2 illustrates how two protection sheet pieces 10A and 10B prepared by cutting the protection sheet 10 shown in FIG. 1 into suitable lengths are applied with partial widthwise overlap to a window plate 50. More specifically, protection sheet piece 10A is directly applied at the side of its one end (at the side of the right end of protection sheet piece 10A in the drawing) to the surface of window plate 50. Protection sheet piece 10B is applied at the side of its one end (at the side of the left end of protection sheet piece 10B in the drawing) over the back face of protection sheet piece 10A. The remaining portion of protection sheet piece 10B is directly applied to the surface of window plate 50, similarly to protection sheet piece 10A. Between the back face of protection sheet piece 10A and the surface of window plate 50, there is present a step having a height corresponding to the thickness (TA+TB) of the protection sheet 10 shown in FIG. 1.

Herein, when the ratio of thickness TA of PSA layer 14 to overall thickness (TA+TB) of protection sheet 10A is somewhat increased (e.g. to 3% or greater), for instance, as shown in FIG. 2, PSA layer 14 can deform to effectively absorb (compensate) the step and make a gap S that may be formed at this location relatively small. From the standpoint of absorbing the step to minimize the gap S as described above, the ratio of PSA layer thickness TA to overall thickness (TA+TB) of the PSA layer is advantageously 4% or higher, preferably 5% or higher, or more preferably 7% or higher. From the standpoint of bringing about a greater step-absorbing ability, this ratio can be 10% or higher, 12% or higher, or even 15% or higher. The upper limit of this ratio is not particularly limited, and it can be, for instance, 50% or lower. From the standpoint of the property balance as a window plate protection sheet and the application workability (e.g. handling properties of the protection sheet, ease of application when the protection sheet is applied by the wet application method, etc.), this ratio is usually suitably 40% or lower, preferably 35% or lower, or more preferably 30% or lower (e.g. 25% or lower).

In the art disclosed herein, the method for providing the PSA layer to the substrate is not particularly limited. For instance, it is possible to employ a method (direct method) where the PSA composition is directly provided (typically applied) to the substrate and subjected to a curing treatment; a method (transfer method) where the PSA composition is provided to a releasable surface (release face) and subjected to a curing treatment to form a PSA layer on the surface followed by adhering the PSA layer to the substrate to transfer the PSA layer to the substrate; and the like. The curing treatment may comprise one, two or more processes selected from drying (heating), cooling, crosslinking, supplemental copolymerization reaction, aging, etc. The curing treatment referred to herein also encompasses, for instance, a process (heating process, etc.) simply to allow a PSA composition containing a solvent to dry, a process simply to cool down (solidify) a heat-melted PSA composition. When the curing treatment comprises two or more processes (e.g. drying and crosslinking), these processes may be performed at once or stepwise.

The PSA composition can be applied, using a commonly-used coater such as a gravure roll coater, reverse roll coater, kiss roll coater, dip roll coater, bar coater, knife coater, spray coater, etc. From the standpoint of accelerating the crosslinking reaction and increasing the productivity, etc., the PSA composition is preferably dried with heating. Depending on the type of substrate to which the composition is applied, for example, the drying temperature can be about 40° C. to 150° C. After dried, it may be subjected to an aging process of storing it around 40° C. to 60° C. so as to further progress the crosslinking reaction. The aging time may be suitably selected according to the desirable crosslinking degree and the rate at which the crosslinking reaction proceeds. It can be, for example, about 12 hours to 120 hours.

Prior to application to a window plate, the vehicle window plate protection sheet disclosed herein may be in a form where a release liner is placed on the surface of the PSA layers. As the release liner, various types of paper (possibly with a resin-laminated surface), plastic film, etc., can be used without particular limitations. The thickness of the release liner is not particularly limited. For instance, it can be about 5 µm to 500 µm (preferably about 10 µm to 200 µm, e.g. about 30 µm to 200 µm). The release face (the face placed in contact with the PSA layer surface) of the release liner may be subjected as necessary to a release treatment with a conventionally known release agent (e.g. general silicone-based, long chain alkyl-based, fluorine-based release agents, etc.). The back face of the release face may or may not be treated with a release agent, or may be subjected to a surface treatment other than a release treatment.

Alternatively, the vehicle window plate protection sheet disclosed herein may be configured as a protection sheet roll that has a release face on the back face of the substrate and is wound in the length direction so that the PSA layer surface is in contact with the back face. In the protection sheet roll in such a configuration, the substrate serves as a release line as well, whereby the use of another release liner separate from the substrate can be reduced. Such a configuration is preferable from the standpoint of cost reduction and waste reduction, etc.

The vehicle window plate protection sheet disclosed herein typically has a flat shape (two-dimensional shape); and it can be applied properly and efficiently along the surface structure of a window plate without spending time and effort on pre-molding it into a three-dimensional shape. In other words, it is unnecessary to mold (e.g. by heating) the protection sheet into a three-dimensional shape to assimilate the surface structure of the window plate. Such a flat protection sheet is preferable from the standpoint of the ease of storage and carriage.

The vehicle window plate protection sheet disclosed herein can be preferably applied by a technique (wet application method) in which water is placed between the adherend surface and the PSA layer during the application work. For instance, it is preferable to employ a technique in which water (water for application) is provided to the window plate surface and while press-bonding the protection sheet to the window plate, the water for application is pushed out of the application range of the protection sheet. The use of water for application can improve the sliding of the protection layer against the adherend surface in the course of application. This can prevent or reduce wrinkles formed during the application of the protection sheet and may further facilitate proper application of the protection sheet. The water used as the water for application is not particularly limited. For instance, any water such as tap water, ion-exchanged water, etc., can be used. For the use as the water for application, a suitable amount of surfactant can be added to such water. Because of the low S1, the protection sheet disclosed herein can be applied to a window plate surface efficiently and adequately even when using surfactant-free water for application. In the peel strength measurement described later in the working examples, water for application formed of ion-exchanged water was used.

The vehicle window plate protection sheet according to an embodiment of the art disclosed herein has a 30-minute peel strength (S1) of less than 0.10 N/20 mm in the peel strength measurement performed by the method described later in the working examples. From the standpoint of obtaining greater ease of application, S1 is preferably 0.07 N/20 mm or less, or more preferably 0.05 N/20 mm or less. In an embodiment where the PSA layer is free of an application aider, it is particularly meaningful that S1 is 0.05 N/20 mm or less. The lower limit of S1 is not particularly limited. From the standpoint of preventing displacement of the protection sheet (i.e. right positioning of the protection sheet) during the application, etc., a protection sheet having an S1 value of 0.005 N/20 mm or greater (e.g. 0.01 N/20 mm or greater) is advantageous.

The vehicle window plate protection sheet according to another embodiment has a 48-hour peel strength (S2) of 0.05 N/20 mm or greater in the peel strength measurement performed by the method described later in the working examples. From the standpoint of the anti-lifting properties, S2 is preferably greater than 0.1 N/20 mm (e.g. 0.12 N/20 mm or greater), or more preferably 0.2 N/20 mm or greater. From the standpoint of obtaining greater ease of application and of the removal workability of the protection sheet, etc., S2 of the protection sheet is usually suitably 5 N/20 mm or less, preferably 3 N/20 mm or less, more preferably 2 N/20 mm or less, or yet more preferably 1.5 N/20 mm or less.

The vehicle window plate protection sheet according to another embodiment has a 7-day peel strength (S3) at 50° C. of 0.05 N/20 mm or greater in the peel strength measurement performed by the method described later in the working examples. From the standpoint of the anti-lifting properties, S3 is more preferably 0.12 N/20 mm or greater, or yet more preferably 0.15 N/20 mm or greater. From the standpoint of the removal workability of the protection sheet, etc., S3 is usually suitably 5 N/20 mm or less, preferably 3 N/20 mm or less, more preferably 2 N/20 mm or less, or yet more preferably 1.5 N/20 mm or less (e.g. 1 N/20 mm or less).

While there are no particular limitations, from the standpoint of combining ease of application and anti-lifting properties at a high level, in the protection sheet disclosed herein, the 7-day peel strength (S3) at 50° C. is three times the 30-minute peel strength (S1) or greater. In other words, the value of S3/S1 is preferably 3 or greater. The S3/S1 value is more preferably 5 or greater, or yet more preferably 10 or greater. From the standpoint of the balance between ease of application and removal workability, S3/S1 is preferably 30 or less, more preferably 25 or less, yet more preferably 20 or less, or particularly preferably 19 or less. The S3/S1 value can be adjusted, for instance, by the use or absence of an application aider (surfactant, hydrophilic polymer, etc.) and suitable selection of the type and amount when used. It can be adjusted also by the composition of the base polymer, the thickness of the PSA layer, and so on.

While there are no particular limitations, from the standpoint of combining ease of application and anti-lifting properties at a high level, in the protection sheet disclosed herein, the 48-hour peel strength (S2) is preferably 6 to 30 times the 30-minute peel strength (S1). In other words, the value of S2/S1 is preferably in a range of 6 to 30. S2/S1 is more preferably in a range of 10 to 25. The S2/S1 value can be adjusted, for instance, by the use or absence of an application aider and suitable selection of the type and amount when used. It can be adjusted also by the composition of the base polymer, the thickness of the PSA layer, and so on.

While there are no particular limitations, in the protection sheet disclosed herein, the 7-day peel strength (S3) at 50° C. is preferably 0.5 to 2 times the 48-hour peel strength (S2). In other words, the value of S3/S2 is preferably in a range of 0.5 to 2. Like this, a protection sheet less susceptible to a change in peel strength at or after 48 hours from its application by the wet application method (i.e. a protection sheet showing little aging change in peel strength) is preferable because it has well-balanced anti-lifting properties and removal workability. From this standpoint, the S3/S2 value is more preferably in a range of 0.7 to 1.5, or yet more preferably in a range of 0.7 to 1.3. The S3/S2 value can be adjusted, for instance, by the use or absence of an application aider and suitable selection of the type and amount when used. It can be adjusted also by the composition of the base polymer, the thickness of the PSA layer, and so on.

In the vehicle window plate protection sheet disclosed herein, the gel fraction (by weight) of the PSA constituting the PSA layer is not particularly limited. From the standpoint of reducing the 30-minute peel strength (S1) to increase the ease of application, the PSA's gel fraction is usually suitably 50% or higher, preferably 60% or higher, more preferably 70% or higher, or yet more preferably 75% or higher. A higher gel fraction is preferable also from the standpoint of preventing the 48-hour peel strength (S2) and 7-day peel strength (S3) at 50° C. from becoming excessively high. The upper limit of the gel fraction is not particularly limited and can be 100%. From the standpoint of the ease of production, the gel fraction is usually preferably 98% or lower, or more preferably 95% or lower. The gel fraction can be adjusted by the composition and molecular weight of the base polymer as well as by a crosslinking agent and other additives, etc.

The gel fraction by weight can be determined by wrapping a measurement sample weighing W1 with a porous tetrafluoroethylene resin sheet and suspending the resultant in ethyl acetate at room temperature for one week, subsequently drying the measurement sample, measuring the weight W2 of its ethyl acetate-insoluble portion, and substituting W1 and W2 into the following equation: gel fraction (%)=W2/W1×100.

More specifically, the gel fraction can be measured by the following method: In particular, a measurement sample weighing approximately 0.1 g is wrapped into a pouch with a porous tetrafluoroethylene resin sheet of 0.2 μm average pore diameter, and the opening is tied with twine. The weight of the wrapping (the combined weight of the porous tetrafluoroethylene resin sheet and the twine) Wa (mg) is measured in advance. The weight of the pouch (the combined weight of the PSA and the wrapping) Wb (mg) is measured. The pouch is placed in a screw vial of volume 50 mL (one screw vial used for each pouch), and the screw vial is filled with ethyl acetate. This is set still at room temperature (typically at 23° C.) for seven days, and the pouch is then removed and allowed to dry at 120° C. for two hours. The weight Wc (mg) of the pouch after dried is measured. The gel fraction of the PSA can be determined by substituting the Wa, Wb and Wc into the following:

$$\text{Gel fraction (\%)}=(Wc-Wa)/(Wb-Wa)\times 100$$

As the porous tetrafluoroethylene resin sheet, trade name "NITOFLON® NTF1122" available from Nitto Denko Corporation or an equivalent product can be used.

The vehicle window plate protection sheet disclosed herein preferably has a haze value of 10% or lower. Such a protection sheet has excellent transparency; and therefore, proper visibility can be ensured to suitably deal with a situation where the vehicle (e.g. an automobile) is transported for delivery by driving it while the vehicle has window plates with the protection sheet applied thereon. From the standpoint of obtaining yet greater visibility, the haze values (%) of the protection sheet is preferably 7% or lower, more preferably 5% or lower, or yet more preferably 3% or lower. The color of the protection sheet is not particularly limited. For instance, it can be a colored transparent protection sheet or a colorless transparent protection sheet, satisfying the haze value of 10% or lower.

The term "haze value (%)" herein refers to the ratio of diffused light transmittance to total light transmittance when the film, sheet or tape of interest is irradiated with visible lights. It is also called cloudiness value. The haze value (%) can be represented by an equation below. Herein, Th is the haze value (%), Td is the diffused light transmittance, Tt is the total light transmittance.

$$Th\ (\%)=Td/Tt\times100$$

Although not particularly limited to, the protection sheet preferably has a thermal expansion (HE(60-10)) between 60° C. and 10° C. of 2.0% or lower. The thermal expansion (HE(60-10)) of the protection sheet can be measured by the following method.

[Measurement of Thermal Expansion (HE(60-10))]

With the machine direction (MD) of the protection sheet being the longitudinal direction (length direction, vertical direction), a 200 mm long by 200 mm wide square measurement sample is obtained. The measurement sample is left standing in an environment at 23° C. and 50% RH for one hour and then marked with lines spaced at an about 150 mm interval.

The measurement sample is stored in a drying oven at 60° C. for one hour. After this, in the environment at 60° C., the length between the lines is measured with calipers to the first decimal place.

Subsequently, the sample is stored in an environment at 10° C. for one hour. After this, in the environment at 10° C., the length between the lines is measured with calipers to the first decimal place.

With $L_{60}$ being the length of the inter-line space (interval) measured in the environment at 60° C. and $L_{10}$ being the length of the inter-line space measured in the environment at 10° C., the thermal expansion (HE(60-10)) is determined by the following equation:

$$HE(60\text{-}10)(\%)=|(L_{60}-L_{10})/L_{60}|\times100$$

Herein, the machine direction (MD) of the protection sheet refers to the direction corresponding to the machine direction of the substrate (typically a plastic film substrate) constituting the protection sheet.

A protection sheet adhered on a window plate of a vehicle (an automobile) may be exposed to a wide range of temperature changes as the vehicle is stored outdoor for a long period, and so on. A protection sheet having a small thermal expansion (HE(60-10)) undergoes little expansion or contraction associated with temperature changes and thus is likely to prevent post-application lifting and wrinkling. This is preferable from the standpoint of resisting aging and temperature changes to maintain good adhesion.

From such a standpoint, the thermal expansion (HE(60-10)) of the protection sheet is more preferably 1.7% or lower, or yet more preferably 1.5% or lower (e.g. 1.3% or lower). The lower limit of thermal expansion (HE(60-10)) is not particularly limited. For instance, the thermal expansion (HE(60-10)) is preferably higher than 0.5%, or more preferably 0.7% or higher.

It is preferable that the thermal expansion (HE(60-10)) measured by the method described above is in these ranges with the MD of the protection sheet being the longitudinal (length) direction. It is also preferable that the thermal expansion (HE(60-10)) is in these ranges when measured in the same manner, but with the latitudinal direction (TD, horizontal direction) (i.e. the direction perpendicular to the MD) of the protection sheet being the longitudinal direction of the measurement sample. For instance, in a preferable protection sheet, the thermal expansion (HE(60-10)) is in these ranges when measured either with its MD being the longitudinal direction or with its TD being the longitudinal direction.

When it is difficult to determine the MD of a protection sheet, as for the MD in the respective measurements and tests disclosed herein, the direction (MD') specified by the following method can be used for convenience.

In particular, the protection sheet is left standing in an environment at 23° C. and 50% RH for one hour; and then, with an arbitrary direction in the protection sheet being assigned as the first direction and the direction orthogonally intersecting the first direction being assigned as the second direction, a 200 mm long by 200 mm wide square measurement sample is cut out with the first direction being its longitudinal (length) direction and the second direction being its latitudinal direction (width direction). The measurement sample is marked in the first direction with a pair of lines spaced at an about 150 mm interval and also marked in the second direction with a pair of lines spaced at about 150 mm interval. The line marking should be completed within five minutes after the measurement sample is cut out.

From the protection sheet after left standing in the environment at 23° C. and 50% RH for one hour or more, a 200 mm long by 200 mm wide square measurement sample is cut out with the third and fourth directions each forming 45° angles with the first and second directions being assigned as the length direction and width direction, respectively. The measurement sample is marked in the third direction with a pair of lines spaced at an about 150 mm interval and further marked in the fourth direction with a pair of lines spaced at about 150 mm interval. The line marking should be completed within five minutes after the measurement sample is cut out.

The measurement sample with the marked lines is stored in a drying oven at 80° C. for one hour. After this, in the environment at 80° C., the length between the marked lines is measured with calipers to the first decimal place. Subsequently, the measurement sample is stored in an environment at 23° C. for one hour. Then, in the environment at 23° C., the length between the marked lines is measured with calipers to the first decimal place.

With $L_{80}$ being the length of the interline space measured in the environment at 80° C. and $L_{23}$ being the length of the interline space measured in the environment at 23° C., with respect to each of the first, second, third and fourth directions, the thermal expansion (HE(80-23)) between 80° C. and 23° C. is determined by the following equation:

$$\text{Thermal expansion}(HE(80\text{-}23))(\%)=|(L_{80}-L_{23})/L_{80}|\times100;$$

and the direction with the largest value is assigned as the MD'.

The value obtained using a measurement sample in which the MD' thus specified is assigned as the length direction by the aforementioned thermal expansion (HE(60-10)) measurement is used as an approximate value of the value of thermal expansion (HE(60-10)) obtained using a measurement sample with its MD being assigned as the length direction. In a preferable protection sheet, the approximate value is 2.0% or lower (more preferably 1.7% or lower, yet more preferably 1.5% or lower, e.g. 1.3% or lower). In a preferable protection sheet, the approximate value is higher than 0.5% (more preferably 0.7% or higher).

Although not particularly limited to, a preferable protection sheet has a tensile modulus at 23° C. (or simply a tensile modulus, hereinafter) of 1800 N/mm$^2$ or lower. It is noted that the tensile modulus of the PSA layer constituting the vehicle window plate protection sheet disclosed herein is extremely small as compared with the tensile modulus of the substrate constituting the protection sheet. Thus, for the tensile modulus referred to herein, the value converted to per cross-sectional surface area of the substrate is used. The tensile modulus of a protection sheet can be measured by the next method.

[Measurement of Tensile Modulus]

With the MD of the protection sheet being the length direction, a 25 mm wide by 50 mm long rectangular measurement sample is obtained. Based on JIS K7127, at room temperature (23° C.), using a precision universal tester Autograph AC-IS (available from Shimadzu Corporation), the measurement sample is elongated at a tensile speed of 300 mm/min and the maximum slope is determined. The measurement is conducted twice and their average value is used as the value of tensile modulus.

With decreasing tensile modulus of the protection sheet, the protection sheet tends to be more susceptible to deformation conforming to a curved surface (have greater curved surface-conformability). This may facilitate making the protection sheet to conform to the surface contours of a window plate to yield proper application. From such a standpoint, the tensile modulus of protection sheet is more preferably 1500 N/mm$^2$ or lower, or yet more preferably 1300 N/mm$^2$ or lower. The lower limit of tensile modulus is not particularly limited. From the standpoint of readily bringing about the preferable thermal expansion (HE(60-10)) described above at the same time, it is usually suitably 400 N/mm$^2$ or higher, preferably 500 N/mm$^2$ or higher, or more preferably 600 N/mm$^2$ or higher. With a higher tensile modulus of the protection sheet, post-application lifting and wrinkling tends to be more readily prevented.

It is preferable that the tensile modulus measured by the method described above is in these ranges with the MD of the protection sheet being the longitudinal direction. It is also preferable that the tensile modulus is in these ranges when measured in the same manner, but with the TD of the protection sheet being the longitudinal direction of the measurement sample. For instance, in a preferable protection sheet, the tensile modulus is in these ranges when measured either with its MD being the longitudinal direction or with its TD being the longitudinal direction.

In the tensile modulus measurement, when it is difficult to determine the MD of a protection sheet, the tensile modulus measurement is carried out, using a measurement sample in which the MD' specified by the aforementioned method is assigned as the length direction; and the result can be used as an approximate value of the MD tensile modulus of the protection sheet. In a preferable protection sheet, the approximate value satisfies the aforementioned preferable tensile modulus. The same applies to the 5% modulus described later.

Although not particularly limited to, a preferable protection sheet has a tensile modulus at 5% elongation at 23° C. (or abbreviated to a 5% modulus, hereinafter) in a range of 7 N/20 mm to 30 N/20 mm. Such a protection sheet may have well-balanced curved surface conformability and handling properties and may be easily made to conform to the surface contours of a window plate to allow proper application. From such a standpoint, the 5% modulus of protection sheet is preferably in a range of 7 N/20 mm to 25 N/20 mm, or more preferably in a range of 8 N/20 mm to 20 N/20 mm. The 5% modulus of protection sheet can be measured by the following method.

It is preferable that the 5% modulus measured by the method described above is in these ranges with the MD of the protection sheet being the longitudinal direction. It is also preferable that the 5% modulus is in these ranges when measured in the same manner, but with the TD of the protection sheet being the longitudinal direction of the measurement sample. For instance, in a preferable protection sheet, the 5% modulus is in these ranges when measured either with its MD being the longitudinal direction or with its TD being the longitudinal direction.

[Modulus Measurement]

With the MD of the protection sheet being the length direction, a 20 mm wide by 130 mm long strip of measurement sample is obtained. The measurement sample is set in a precision universal tester Autograph AG-IS (available from Shimadzu Corporation) and, at room temperature (23° C.), subjected to a tensile test at a tensile speed of 300 mm/min at a chuck distance of 50 mm to obtain a stress-distortion curve. The stress value at 5% elongation of the 20 mm wide measurement sample is used as the 5% modulus at 23° C.

The vehicle window plate protection sheet disclosed herein may be used to protect window plates of various components in various types of vehicles as described above. When the vehicle is an automobile, preferable examples of the window plate protected with the protection sheet include front and rear windshields. Other examples include window plates used for side windshields, quarter windshields, stationary windshields, etc. The protection sheet disclosed herein is particularly preferably applied to a front windshield of an automobile. This is because the front windshield has a large surface area among window plates of an automobile and has higher probability of getting hit by a small stone, etc.; and further, it readily comes in the sight of a user of the automobile and has a significant impact on the product value. Moreover, in a passenger vehicle, because of the highly designed features as compared with a bus or truck in general, a window plate therein tends to be greatly curved. Accordingly, the vehicle window plate protection sheet disclosed herein can be particularly preferably applied to a window plate (e.g. a window plate for a front windshield, a window plate for a rear windshield) of a passenger vehicle. The vehicle window plate protection sheet disclosed herein is particularly preferable as a protection sheet applied to a window plate formed with a three-dimensional surface structure.

Several working examples relating to the present invention are described below, but the present invention is not intended to be limited to these specific examples. In the description below, "parts" and "%" are based on weight unless otherwise specified. The respective physical properties in the next description were measured or tested as described below.

[Measurement of Thickness of PSA Layer]

The release liner was removed from the PSA sheet according to each example. Using a 1/10000 dial gauge, the overall thickness of the PSA sheet (the combined thickness of the PSA layer and substrate) was measured at five different points and their arithmetic average value was determined. Subsequently, the PSA layer of the PSA sheet was swollen with toluene and scraped off the substrate to expose the surface of the substrate. The thickness of the exposed substrate was measured at five different points with the 1/10000 dial gauge and their arithmetic average value was determined. The difference between the average overall thickness of the PSA sheet and the average thickness of the substrate was recorded as the thickness (average thickness) of the PSA layer.

[Test for Ease of Application]

(1. Ease of Application to Front Windshield of Automobile)

From the PSA sheet according to each example, a pattern was die-cut to resemble a planar projection of the front windshield of a Toyota Motor product, vehicle model "86" (a 2012 year model), with the pattern being equivalent to 70% of the surface area of the front windshield. The die-cutting was performed along with the release liner. The PSA sheet was oriented so that the MD of the substrate constituting the PSA sheet was in the width direction (left-right direction) of the front windshield. By the wet application method described below, the PSA sheet was applied to the outer surface of the front windshield so that the outer edges of the PSA sheet were more or less equidistant from the outer edges of the front windshield.

In particular, ion-exchanged water (water for application) was spread over the surface of the front windshield. From the PSA sheet, the release liner was removed to expose the PSA layer and the PSA sheet was positioned by applying it in the vicinity of the vertical center on the left side of the front windshield wet with the ion-exchanged water. Subsequently, the entire PSA sheet was adhered to the surface of the front windshield by placing a squeegee on the back face of the PSA sheet, sliding the squeegee along the back face of the PSA sheet while allowing the PSA sheet to conform to the surface structure of the front windshield and pushing it against the front windshield to push out the air and water. The action of pushing out the air and water can also be thought as an action of drawing out (squeezing out) the air and water.

In this test for ease of application, the time taken for completing the application of the PSA sheet after its positioning was limited to at most 5 minutes. Subsequently, the PSA sheet applied was visually inspected for the presence of wrinkles and bubbles, and graded according to the following three levels:

G (good): No presence of wrinkles or bubbles was observed.

A (acceptable): No presence of wrinkles was observed, but the presence of bubbles was observed.

P (poor): The presence of both wrinkles and bubble was observed.

(2. Ease of Application to Polycarbonate Plate)

From the PSA sheet according to each example, the same pattern as in the test for ease of application to front windshield of automobile was die-cut. A flat, rectangular polycarbonate plate (PC plate) sized to allow for application of the entire PSA sheet was molded three-dimensionally (curved) to have a vertical radius of curvature of 3000 mm and a horizontal radius of curvature of 15000 mm. To the outer surface (convex surface) of the thus molded PC plate, the PSA sheet die-cut was applied by the same wet application method as above.

In this test for ease of application, the time taken for completing the application of the PSA sheet after its positioning on the PC plate was limited to at most 5 minutes. Subsequently, the PSA sheet applied was visually inspected for the presence of wrinkles and bubbles, and graded according to the following three levels:

G (good): No presence of wrinkles or bubbles was observed.

A (acceptable): No presence of wrinkles was observed, but the presence of bubbles was observed.

P (poor): The presence of both wrinkles and bubble was observed.

[Evaluation of Anti-Lifting Properties]

(1. Anti-Lifting Properties to Front Windshield of Automobile)

At 24 hours from the application of the PSA sheet to the front windshield in the test for ease of application, the PSA sheet was visually inspected for the presence of an outer edge section lifted above the surface of the front windshield, and the anti-lifting properties were graded according to the following three levels:

G (good): No lifting section was observed.

A (acceptable): A somewhat lifting section was found, but the extent was practically irrelevant.

P (poor): A clearly lifting section was observed.

(2. Anti-Lifting Properties to Polycarbonate Plate)

At 24 hours from the application of the PSA sheet to the PC plate in the test for ease of application, the PSA sheet was visually inspected for the presence of an outer edge section lifted above the surface of the PC plate, and the anti-lifting properties were graded according to the following three levels:

G (good): No lifting section was observed.

A (acceptable): A somewhat lifting section was found, but the extent was practically irrelevant.

P (poor): A clearly lifting section was observed.

[Measurement of Peel Strength]

(1. Peel Strength to Glass Plate)

The PSA sheet according to each example was cut along with the release liner into a 20 mm wide strip to prepare a measurement sample, with the MD of the substrate constituting the PSA sheet being the vertical direction. From the measurement sample, one release liner was removed. In an environment at 23° C. and 50% RH, the sample was applied to a glass plate as the adherend by the wet application method described below.

In particular, ion-exchanged water (water for application) was spread over the surface of green glass (a flat, rectangular glass plate of 150 mm long by 75 mm wide by 4 mm thick) available from Nippon Sheet Glass Co., Ltd. From the measurement sample, the release liner was removed to expose the PSA layer and the resulting PSA layer was positioned by applying one end of its length direction to the glass plate wet with the ion-exchanged water. Subsequently, the measurement sample was adhered to the surface of the glass plate by placing a squeegee on the back face of the PSA sheet, sliding the squeegee along the back face of the PSA sheet while pushing the measurement sample against the surface of the glass plate to push out the air and water. The squeeze was slided once in the length direction of the measurement sample.

The measurement sample thus adhered to the glass plate was stored in an environment at 23° C. and 50% RH for 30 minutes. Subsequently, in the same environment, using a universal tensile and compression testing machine (available from Minebea Co., Ltd., system name "Tensile/Compression Tester, TG-1kN"), based on JIS Z0237, peel strength (N/20 mm) was measured at a tensile speed of 300 mm/min at a peel angle of 180°. Two measurements were taken and their arithmetic average value was recorded as the 30-minute peel strength (S1).

Another measurement sample applied to the glass plate by the same wet application method was stored in an environment at 23° C. and 50% RH for 48 hours. Peel strength (N/20 mm) was then measured in the same manner. Two measurements were taken and their arithmetic average value was recorded as the 48-hour peel strength (S2).

Another measurement sample applied to the glass plate by the same wet application method was stored in an environment at 50° C. for 7 days and then in an environment at 23° C. and 50% RH for one hour. Subsequently, peel strength (N/20 mm) was measured in the same manner. Two measurements were taken and their arithmetic average value was recorded as the 7-day peel strength (S3) at 50° C.

(2. Peel Strength to Polycarbonate Plate)

In place of the glass plate, a PC plate (150 mm long, 75 mm wide, 4 mm thick, flat and rectangular) was used as the adherend. Otherwise in the same manner as above, the measurement sample was applied to the PC plate by the wet application method. This was stored in an environment at 23° C. and 50% RH for 48 hours. Peel strength (N/20 mm) was then measured in the same manner. Two measurements were taken and their arithmetic average value was recorded as the 48-hour peel strength to PC plate.

[Weight Average Molecular Weight (Mw)]

The weight average molecular weight Mw was measured, using a GPC measurement system, trade name "HLC-8120GPC," available from Tosoh Corporation under the conditions shown below and determined as the value based on standard polystyrene.

[GPC Measurement Conditions]
Sample concentration: about 2.0 g/L (tetrahydrofuran solution)
Sample injection volume: 20 μL
Columns: trade name "TSK gel, super AWM-H+super AW4000+super AW2500" (available from Tosoh Corporation)
Column size: each 6.0 mm I.D.×150 mm
Eluent: tetrahydrofuran (THF)
Flow rate: 0.4 mL/min
Detector: differential refractometer (RI)
Column temperature (measurement temperature): 40° C.

Example 1

To a reaction vessel equipped with a stirring propeller, thermometer, nitrogen gas inlet and condenser, were placed 50 parts of 2-ethylhexyl acrylate (2EHA), 50 parts of ethyl acrylate (EA), 5 parts of methyl methacrylate (MMA) and 5 parts of 2-hydroxyethyl acrylate (HEA) and toluene. The resulting mixture was gently stirred under nitrogen flow for at least one hour. The mixture was then heated to 60° C. To this, was added 0.2 part of benzoyl peroxide (BPO) (available from NOF Corporation, trade name "NYPER BW"). The polymerization reaction was carried out for 12 hours while keeping the mixture around 60° C. An acrylic polymer in toluene solution (A) (50% non-volatiles) was thus prepared. The acrylic polymer had a weight average molecular weight (Mw) of $65 \times 10^4$.

To the acrylic polymer in toluene solution (A), for 100 parts of the acrylic polymer, were added 3 parts of an isocyanate-based crosslinking agent (available from Nippon Polyurethane Industry Co., Ltd., trade name "CORONATE L"), 0.1 part of dioctyltin dilaurate (available from Tokyo Fine Chemical Co., Ltd., trade name "EMBILIZER OL-1" and toluene to a final non-volatile content of 20%. The mixture was thoroughly stirred to prepare a PSA composition of this example.

Random polypropylene (available from Japan Polypropylene Corporation, trade name "WINTEC WFW4") was heated to melt and well mixed in a film-molding machine and extruded from a T-die of the molding machine to form a 50 μm film. One surface of this film (substrate) was subjected to corona discharge treatment. To the surface treated by corona discharge, the PSA composition was directly applied and heated at 80° C. for 3 minutes to dry to form a 10 μm thick PSA layer. A PSA sheet according to this example was thus fabricated.

Examples 2-5

The thickness of the PSA layer was changed to 7 μm (Example 2), 5 μm (Example 3), 3 μm (Example 4) and 1 μm (Example 5), but otherwise in the same manner as Example 1, PSA sheets according to Examples 2 to 5 were fabricated, respectively.

Example 6

To the acrylic polymer in toluene solution (A), for 100 parts of the acrylic polymer, 0.1 part (by active ingredient) of an application aider was further added. Otherwise in the same manner as Example 1, a PSA composition according to this example was prepared. Using this PSA composition, but otherwise in the same manner as Example 1, a PSA sheet according to this example was fabricated. As the application aider, was used a surfactant under trade name "PHOSPHANOL® RL-210" (ingredient name: polyoxyethylene stearyl ether phosphoric acid ester (not neutralized), pH 2.4 (10%), HLB value 5.4) available from Toho Chemical Industry Co., Ltd. In this surfactant, the average number of moles of ethylene oxide added (i.e. the average number of oxyethylene repeat units) is 2. Hereinafter, this surfactant is referred to as "PHOSPHANOLRL-210."

Examples 7-10

The thickness of the PSA layer was changed to 7 μm (Example 7), 5 μm (Example 8), 3 μm (Example 9) and 1 μm (Example 10), but otherwise in the same manner as Example 6, PSA sheets according to Examples 7 to 10 were fabricated.

Examples 11-13

The amount of "PHOSPHANOLRL-210" used to 100 parts of the acrylic polymer was changed to 0.05 part (Example 11), 0.2 part (Example 12) and 1.0 part (Example 13), but otherwise in the same manner as Example 8, PSA sheets according to Examples 11 to 13 were fabricated.

Example 14

As the application aider, in place of "PHOSPHANOLRL-210", trade name "SANNIX PP-1000" (main ingredient: polypropylene glycol, average number of functional groups:

2, number average molecular weight: 1000, viscosity: 145 mPa·s (25° C.)) available from Sanyo Chemical Industries, Ltd., was used at a ratio of 0.1 part to 100 parts of the acrylic polymer. Otherwise in the same manner as Example 8, a PSA sheet according to this example was fabricated.

Examples 15, 16

The amount of "SANNIX PP-1000" used to 100 parts of the acrylic polymer was changed to 1.0 part (Example 15) and 5.0 parts (Example 16), but otherwise in the same manner as Example 14, PSA sheets according to Example 15 and Example 16 were fabricated.

Example 17

As the application aider, in place of "PHOSPHANOLRL-210", trade name "NEWPOL PE-71" (main ingredient: polyoxyethylene-polyoxypropylene block copolymer, hardening point: −30° C.) available from Sanyo Chemical Industries, Ltd., was used at a ratio of 0.2 part to 100 parts of the acrylic polymer. Otherwise in the same manner as Example 8, a PSA sheet according to this example was fabricated.

Example 18

The amount of "NEWPOL PE-71" used to 100 parts of the acrylic polymer was changed to 1.0 part, but otherwise in the same manner as Example 17, a PSA sheet according to this example was fabricated.

Example 19

In this example, as the application aider, to 100 parts of the acrylic polymer, were used 0.1 part of "PHOSPHA-NOLRL-210" and 5.0 parts of "NEWPOL PE-71" in combination. Otherwise in the same manner as Example 8, a PSA sheet according to this example was fabricated.

The PSA layers of the PSA sheets obtained in Examples 1 to 19 were measured for gel fraction, all resulting in gel fractions ranging from 91 to 95%. These PSA sheets had each a haze value of about 3.0%, a thermal expansion (HE(60-10)) of about 1.0%, tensile modulus of about 600 $N/mm^2$ and 5% modulus of about 8 N/20 mm.

With respect to each of the PSA sheets obtained in Examples 1 to 19, a release face of a release liner was adhered to a surface (surface adhered to adherend) of the PSA sheet to form a release liner-bearing PSA sheet and this was aged in an environment at 23° C. and 50% RH for 1 hour and then used for various measurements and tests. As the release liner, a 50 μm thick PET film was used, with it having one face (release face) with release treatment.

The results are shown in Table 1 and Table 2. To make the tables easy to reference, some of the data of Example 8 in Table 1 are included in Table 2 again. While not shown in Table 2, the PSA sheets according to Examples 11 to 19 had each a 30-minute peel strength in a range of 0.02 N/20 mm to 0.05 N/20 mm.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Base polymer | Monomers (parts) | 2EHA | 50 | 50 | 50 | 50 | 50 | 50 | 50 | 50 | 50 | 50 |
| | | EA | 50 | 50 | 50 | 50 | 50 | 50 | 50 | 50 | 50 | 50 |
| | | MMA | 5 | 5 | 5 | 5 | 5 | 5 | 5 | 5 | 5 | 5 |
| | | HEA | 5 | 5 | 5 | 5 | 5 | 5 | 5 | 5 | 5 | 5 |
| PSA (parts) | | Base polymer | 100 | 100 | 100 | 100 | 100 | 100 | 100 | 100 | 100 | 100 |
| | Crosslinking agent | Coronate L | 3 | 3 | 3 | 3 | 3 | 3 | 3 | 3 | 3 | 3 |
| | Crosslinking accelerator | Embilizer OL-1 | 1 | 1 | 1 | 1 | 1 | 1 | 1 | 1 | 1 | 1 |
| | Application aider | Phosphanol RL-210 | — | — | — | — | — | 0.1 | 0.1 | 0.1 | 0.1 | 0.1 |
| | PSA layer Thickness (μm) | | 10 | 7 | 5 | 3 | 1 | 10 | 7 | 5 | 3 | 1 |
| To front windshield Wet application | Ease of application | | A | A | G | G | G | G | G | G | G | G |
| | Anti-lifting properties | | G | G | G | G | A | G | G | G | G | A |
| To window plate Wet application | Peel strength (N/20 mm) | 23° C., 30-min (S1) | 0.08 | 0.06 | 0.04 | 0.02 | 0.02 | 0.06 | 0.04 | 0.02 | 0.02 | 0.02 |
| | | 23° C., 48-hour (S2) | 3.21 | 1.62 | 1.08 | 0.44 | 0.10 | 1.11 | 0.62 | 0.45 | 0.24 | 0.08 |
| | | 50° C., 7-day (S3) | 3.10 | 1.95 | 1.73 | 1.19 | 0.11 | 0.94 | 0.74 | 0.34 | 0.26 | 0.09 |
| | Peel strength ratio | 48-hour/30-min (S2/S1) | 40.1 | 27.0 | 27.0 | 22.0 | 5.0 | 18.5 | 15.5 | 22.5 | 12.0 | 4.0 |
| | | 7-day/30-min (S3/S1) | 38.8 | 32.5 | 43.3 | 59.5 | 5.5 | 15.7 | 18.5 | 17.0 | 13.0 | 4.5 |
| | | 7-day/48-hour (S3/S2) | 0.97 | 1.20 | 1.60 | 2.70 | 1.10 | 0.85 | 1.19 | 0.76 | 1.08 | 1.13 |
| To PC plate Wet application | Ease of application | | A | A | A | G | G | G | G | G | G | G |
| | Anti-lifting properties | | G | G | G | G | G | G | G | G | G | G |
| | 23° C., 48-hour Peel strength (N/20 mm) | | 3.61 | 3.24 | 2.42 | 1.08 | 0.35 | 1.25 | 0.88 | 0.91 | 0.55 | 0.33 |

TABLE 2

| | | | Ex. 11 | Ex. 8 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| Base polymer | Monomers (parts) | 2EHA | 50 | 50 | 50 | 50 | 50 | 50 | 50 | 50 | 50 | 50 |
| | | EA | 50 | 50 | 50 | 50 | 50 | 50 | 50 | 50 | 50 | 50 |
| | | MMA | 5 | 5 | 5 | 5 | 5 | 5 | 5 | 5 | 5 | 5 |
| | | HEA | 5 | 5 | 5 | 5 | 5 | 5 | 5 | 5 | 5 | 5 |
| PSA (parts) | | Base polymer | 100 | 100 | 100 | 100 | 100 | 100 | 100 | 100 | 100 | 100 |
| | Crosslinking agent | Coronate L | 3 | 3 | 3 | 3 | 3 | 3 | 3 | 3 | 3 | 3 |

TABLE 2-continued

| | | | Ex. 11 | Ex. 8 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| | Crosslinking accelerator | Embilizer OL-1 | 1 | 1 | 1 | 1 | 1 | 1 | 1 | 1 | 1 | 1 |
| | Application aider | Phosphanol RL-210 | 0.05 | 0.1 | 0.2 | 1.0 | — | — | — | — | — | 0.1 |
| | | Sannix PP-1000 | — | — | — | — | 0.1 | 1.0 | 5.0 | — | — | — |
| | | Newpol PE | — | — | — | — | — | — | — | 0.2 | 1.0 | 5.0 |
| | PSA layer Thickness (μm) | | 5 | 5 | 5 | 5 | 5 | 5 | 5 | 5 | 5 | 5 |
| To front windshield Wet application | Ease of application | | G | G | G | G | G | G | G | G | G | G |
| | Anti-lifting properties | | G | G | G | A | G | G | G | G | G | A |
| To window plate Wet application | Peel strength (N/20 mm) | 23° C., 48-hour (S2) | 0.88 | 0.45 | 0.20 | 0.10 | 0.28 | 0.12 | 0.15 | 0.31 | 0.20 | 0.10 |
| | | 50° C., 7-day (S3) | 0.65 | 0.34 | 0.22 | 0.08 | 0.34 | 0.20 | 0.22 | 0.44 | 0.30 | 0.09 |
| | Peel strength ratio | 7-day/48-hour (S3/S2) | 0.74 | 0.76 | 1.10 | 0.80 | 1.21 | 1.67 | 1.47 | 1.42 | 1.50 | 0.90 |

As shown in Tables 1 and 2, with respect to the PSA sheets of Examples 1 to 19 with 30-minute peel strength (S1) below 0.10 N/20 mm and 48-hour peel strength (S2) at or above 0.05 N/20 mm, when applied to the front windshield by the wet application method, they exhibited practically acceptable ease of application and anti-lifting properties. In particular, ease of application and anti-lifting properties were combined at a high level with respect to the PSA sheets of Examples 6 to 9, 11 to 12 and 14 to 18 each comprising an application aider with S2 above 0.1 N/20 mm. When no application aider was used, good results were obtained with the PSA sheets of Examples 3 and 4 with S1 at or below 0.05 N/20 mm and 48-hour peel strength (S2) at or above 0.05 N/20 mm.

From the comparison between Examples 1 to 5 and Examples 6 to 10 shown in Table 1, it can be seen that the inclusion of an application aider in the PSA layer has brought about a wider range of thickness of PSA layer capable of combining ease of application and anti-lifting properties at a high level. From the results shown in Table 1, it can be found that a PSA sheet with great ease of application to glass plate and great anti-lifting properties tends to exhibit more or less equally great ease of application and anti-lifting properties to a polycarbonate plate as well.

From the results shown in Table 2, it can be found that with respect to Examples 8 and 11 to 13 using "PHOSPHANOL RL-210" among the three types of application aider, the values of S3/S2 were all in a range of 0.7 to 1.3 with little aging change in peel strength.

With respect to the PSA sheet fabricated in the same manner as Example 1 except that the thickness of the PSA layer was 15 μm, 30-minute peel strength (S1) by the same wet application method was measured and tested for ease of application and anti-lifting properties to the front windshield. The result confirmed that this PSA sheet had an S1 value above 0.10 N/20 mm. While the PSA sheet showed good anti-lifting properties, it fell short of the PSA sheet of Example 1 in terms of ease of application.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 10, 10A, 10B vehicle window plate protection sheet (pieces)
12 substrate
14 PSA layer
50 window plate

The invention claimed is:

1. A vehicle window plate protection sheet which is applied to a window plate of a vehicle to protect the window plate, comprising a substrate and a pressure-sensitive adhesive layer provided to one face of the substrate and satisfying the following conditions:
   (A) having a 30-minute peel strength (S1) of less than 0.10 N/20 mm when the protection sheet is applied to a glass plate by a wet application method where water is provided to the surface of the glass plate and the protection sheet is press-bonded to the glass plate while pushing the water present between the glass plate surface and the pressure-sensitive adhesive layer to the outside of the bonding area; and
   (B) having a 48-hour peel strength (S2) of 0.05 N/20 mm or greater when applied to the glass plate by the wet application method,
   wherein the pressure-sensitive adhesive layer is formed with a pressure-sensitive adhesive composition comprising a base polymer,
   the pressure-sensitive adhesive layer further comprises an application aider,
   the application aider comprises one, two or more species selected among anionic surfactants, nonionic surfactants and hydrophilic polymers,
   the content of the application aider is 10 parts by weight or less to 100 parts by weight of the base polymer,
   wherein the pressure-sensitive adhesive composition comprises an acrylic polymer as the base polymer, and
   wherein the acrylic polymer is formed of a monomer mixture comprising:
   30% by weight or greater of a monomer (a) represented by the following formula (1)

$$CH_2=C(R^1)COOR^2 \qquad (1)$$

in which $R^1$ is a hydrogen atom or a methyl group and $R^2$ is an $C_{6-16}$ acyclic alkyl group;
   30% by weight or greater of a monomer (b) represented by the following formula (2)

$$CH_2=C(R^3)COOR^4 \qquad (2)$$

in which $R^3$ is a hydrogen atom or a methyl group and $R^4$ is an $C_{1-3}$ acyclic alkyl group; and
   2 to 20 parts by weight of a hydroxy group-containing monomer to 100 parts by weight of all alkyl (meth) acrylate.

2. The vehicle window plate protection sheet according to claim 1, wherein the pressure-sensitive adhesive composition is a solvent-based pressure-sensitive adhesive composition.

3. The vehicle window plate protection sheet according to claim 1, wherein the pressure-sensitive adhesive layer has a thickness TA of 1 μm or larger,
the substrate has a thickness TB of 20 μm or larger, but 300 μm or smaller, and
the thickness TA of the pressure-sensitive adhesive layer is at least 3% of the combined thickness (TA+TB) of the pressure-sensitive adhesive layer thickness TA and the substrate thickness TB.

* * * * *